United States Patent [19]

Palladino et al.

[11] 4,000,120

[45] Dec. 28, 1976

[54] PROCESS OF RENDERING POLYMERIC MATERIAL DEGRADABLE UNDER THE DIRECT ACTION OF SUNLIGHT BY THE ADDITION OF DURENE

[75] Inventors: Nicola Palladino, Monterotondo; Marcello Mazzei, Milan; Walter Marconi, San Donato Milanese, all of Italy

[73] Assignee: Snam Progetti S.p.A., Milan, Italy

[22] Filed: Oct. 24, 1974

[21] Appl. No.: 517,753

[30] Foreign Application Priority Data

Oct. 24, 1973 Italy .................................. 30485/73

[52] U.S. Cl. ............................ 526/1; 260/33.6 PQ; 260/DIG. 43; 526/22; 526/20; 526/12; 526/914
[51] Int. Cl.² .................. C08J 3/20; C08F 110/02; C08F 10/02; C08F 12/08
[58] Field of Search ............. 260/DIG. 43, 33.6 PQ, 260/88.2 R, 88.2 B, 93.5 R, 93.7, 94.9 GC

[56] References Cited

UNITED STATES PATENTS

| 3,054,768 | 9/1962 | Quinn | 260/33.6 PQ |
| 3,201,364 | 8/1965 | Salyer | 260/33.6 PQ |
| 3,709,806 | 1/1973 | Minami et al. | 260/33.6 PQ |
| 3,797,690 | 3/1974 | Taylor et al. | 260/DIG. 43 |

FOREIGN PATENTS OR APPLICATIONS 46-38686  11/1971  Japan .................. 260/DIG. 43

OTHER PUBLICATIONS

Br. Polymer Journal, 1970, vol. 2, pp. 217–221, Fitton et al.

Primary Examiner—Eugene C. Rzucidlo
Attorney, Agent, or Firm—Ralph M. Watson

[57] ABSTRACT

A plastic material such as a polyethylene which is adapted for use in packaging is rendered photodegradable under the direct action of sunlight by mixing therewith an amount, up to 3% by weight, of an additive consisting of 1.2.4.5 tetramethylbenzene.

2 Claims, No Drawings

PROCESS OF RENDERING POLYMERIC MATERIAL DEGRADABLE UNDER THE DIRECT ACTION OF SUNLIGHT BY THE ADDITION OF DURENE

The present invention relates to the preparation of thermoplastic materials which are usually stable indoors but rapidly degradable outdoors under the direct action of the sun light.

The resistance against the atmospheric and mirobiological agents, one of the factors responsible for the extensive adaption of plastic materials in the packaging industry in particular, has caused the problem of waste accumulation of the plastic materials in the natural environment.

In order to avoid these drawbacks solutions have been proposed such as, for instance, the use of internally unstable polymers or the use of additives which cause the more common polymers to undergo a photodegradation reaction selectively excited by the ultraviolet radiations of the sun's spectrum.

In fact, for limited agricultural uses the employment of polybutene-1 and copolymers, syndiotactic polybutadiene 1-2 and copolymers has been proposed.

On the other hand with respect to plastic materials usable in the packing field which, at present, are the highest waste source, there have been proposed solutions consisting in introducing into the more widely used polymers, both by copolymerisation and additivation, groups which are photosensitive in the near U.V. and thus adapted to start photooxidation reactions when the polymer is exposed to the direct action of the sun light.

According to this solution, there has been proposed the employment of copolymers constituted by styrene with vinylketones or carbon monoxide, and by ethylene with carbon monoxide.

With respect to the additives it has been proposed to employ iron dialkyldithiocarbamates or other transition metal complexes, gamma-pyrone derivatives, alkyl, alkylaryl and aryl ketones, and other systems which, generally acting as hydrogen removing agents when subjected to the direct action of the sun light, are able to start a very an accelerated photooxidation reaction of the polymer.

The present invention relates to the employment of additives which, under the direct action of the sun light, are able to photosensitize the activation of molecular oxygen to singlet oxygen as the main factor in the accelerated outdoor degradation of the most common polyolefins such as polyethylene, polypropylene, polystyrene and copolymers thereof: the present invention relates to such materials.

The present invention consists in employing durene (1.2.4.5 tetramethylbenzene) and its highest homologous compounds as promoters of photooxidation reactions.

Without dwelling upon the degradation mechanism we think that, because of their structure and their spectral characteristics, when subjected to the action of the sun light, such products may act either as extractors of alkyl hydrogens from the unsaturations of the commercial polyolefins or as activators of molecular oxygen from the fundamental triplet state to the excited singlet state.

In such a state oxygen can react either with the polymer or with the same photosensibilizer, thus giving rise to a photodegradative process.

Such additives, with respect to the photosensitizers which principally act by extracting hydrogen from the polymer, have the advantage of no self-delay phenomena and moreover since their action depends on the diffusion of oxygen into the polymer, they do not undergo any remarkable reduction in activity when the additive is alkylated or grafted to the polymer in order to limit the migratory movement thereof.

Substantially the inventive process consists in adding 1.2.4.5 tetramethyl benzene or its highest homologues having an alkyl radical of a variable chain in an amount up to 3 %, preferably 0.1 – –1 % by weight depending upon the use, to plastic material containing the more usual commercial additives such as antioxidants, plasticizer, antistatic agents, etc.

The additive can be introduced into the polymer according to a known technique as dust mixing, milling, etc.

EXAMPLE 1

To high density commercial polyethylene containing small amounts of antioxidants, antistatic agents and other conventional ingredients there was added 1.2.4.5 tetramethyl benzene according to a known method, in an amount equal to 1 % by weight.

Films were obtained by melting the polymer in a CARVER press heated to 200° C having a thickness of about 0.02 cm. Such films were exposed to the radiations of a high pressure Xenon lamp which had a spectral energy similar to that of the sun light.

The polymer degradation rate was followed by infrared spectroscopy, by measuring the areas of bands between 5.65 and 6 $\mu$, characteristic of the carboxylic groups, and the appearance thereof in the polymer is to be correlated to the loss of the physical and mechanical properties thereof.

For this purpose we plotted a calibration curve by employing stearone as standard, and reportng the number of CO groups per gram of polymer against the ratio between the bands comprised from 5.65 to 6 $\mu$ and the film thickness.

During the exposure of the films the temperature, was kept constant at 29°– 32°C.

The following table reports the results obtained after the exposures of the polymer, with and without the additives, to the Xenon lamp.

| SAMPLE | n° CO/g Pol. $10^5$ after the following exposure hours at 29 – 32° C | | | | | |
|---|---|---|---|---|---|---|
| | 0 | 25 | 55 | 85 | 115 | 155 |
| Polyethylene with out any additive | — | — | 1.2 | 1.2 | 1.6 | 1.6 |
| Polyethylene + durene | — | 4.8 | 9.4 | 11.2 | 12.3 | 14 |

From the reported results it is possible to appreciate the high degradation rate of the polymer to which durene had been added.

EXAMPLE 2

Some films of commercial polypropylene obtained in the same way as the relevant samples of the preceding example were exposed to the radiations of the high pressure Xenon lamp.

The polymer degradation rate was followed by means of the technique described in the preceding example.

The following table reports the values obtained after the exposures of the polymer, with and without additives, to the Xenon lamp.

| SAMPLE | N° CO/g Pol. $10^5$ after the following exposure hours at 29 – 32° C | | | |
|---|---|---|---|---|
| | 0 | 30 | 60 | 90 |
| Polypropylene without any additive | 2.1 | 2.1 | 12.2 | 21.5 |
| Polypropylene — + durene % | 2.4 | 14.4 | 18.4 | 28.5 |

The highest degradation rate is evident for the polymer to which durene had been added.

What is claimed is:

1. A process of rendering a plastic material, consisting essentially of polyethylene, polypropylene, polystyrene or a copolymer thereof and adapted for use in packaging, photodegradable under the direct action of sunlight, which consists in combining with said plastic material an amount not greater than 3% by weight of an additive consisting of 1.2.4.5 tetramethylbenzene.

2. A process of rendering a plastic material photodegradable as claimed in claim 1, wherein the amount of said 1.2.4.5 tetramethylbenzene is in the range of form 0.1 to 1% by weight.

* * * * *

UNITED STATES PATENT AND TRADEMARK OFFICE
CERTIFICATE OF CORRECTION

PATENT NO. : 4,000,120
DATED : December 28, 1976
INVENTOR(S) : Nicola Palladino, et al It is certified that error appears in the above-identified patent and that said Letters Patent are hereby corrected as shown below:

Column 1, line 10, Correct "mirobio-" to read --microbio- --.

Column 4, line 12, Correct "form" to read --from--.

Signed and Sealed this

Twenty-ninth Day of November 1977

[SEAL]

Attest:

RUTH C. MASON
Attesting Officer

LUTRELLE F. PARKER
Acting Commissioner of Patents and Trademarks